United States Patent
Goel

(10) Patent No.: US 7,849,193 B1
(45) Date of Patent: Dec. 7, 2010

(54) MULTIPLE HYPERLINKS IN A UNIFORM RESOURCE LOCATOR

(75) Inventor: Paresh Goel, Izzatnagar Bareilly (IN)

(73) Assignee: Adobe Systems Incorporated, San Jose, CA (US)

( * ) Notice: Subject to any disclaimer, the term of this patent is extended or adjusted under 35 U.S.C. 154(b) by 460 days.

(21) Appl. No.: 11/701,088

(22) Filed: Feb. 1, 2007

(51) Int. Cl.
*G06F 17/00* (2006.01)
*G06F 9/00* (2006.01)
*G06F 17/30* (2006.01)

(52) U.S. Cl. .................. 709/226; 709/219; 715/206; 715/207

(58) Field of Classification Search ......... 709/223–226, 709/217–219; 715/206–207
See application file for complete search history.

(56) References Cited

U.S. PATENT DOCUMENTS

| 6,041,324 A * | 3/2000 | Earl et al. ............... 707/9 |
| 2005/0022008 A1* | 1/2005 | Goodman et al. ........... 713/201 |
| 2006/0218247 A1* | 9/2006 | Sauve et al. ............... 709/219 |

* cited by examiner

*Primary Examiner*—Joseph E Avellino
*Assistant Examiner*—Thai N Nguyen

(57) ABSTRACT

A hyperlinking process identifies a uniform resource locator within content (e.g., within a web page, document, etc.). The hyperlinking process further identifies a plurality of subparts of the uniform resource locator. In this manner, each subpart represents a distinct location separately referenceable from a location referenced by the entire uniform resource locator. Additionally, the hyperlinking process receives a selection of a subpart of the uniform resource locator that identifies a selected subpart. In response to the selection of the subpart, the hyperlinking process references the distinct location associated with the selected subpart.

27 Claims, 5 Drawing Sheets

MULTIPLE HYPERLINKS IN A UNIFORM RESOURCE LOCATOR

BACKGROUND

Conventional software applications enable a user to interact with content displayed within a graphical user interface (GUI) via an input device (e.g., keyboard, mouse, etc.). In particular, such software applications include word processing documents, web browsers, Adobe Reader™ and Adobe Acrobat™ (e.g., for viewing Adobe Portable Document Format documents "PDF"), and the like. By using an input device such as a mouse, a user can add to, delete, edit, manipulate, navigate through, etc., the various content displayed by the conventional software applications in a graphical user interface.

More particularly, conventional software applications can also enable a user to navigate to different locations in a network (e.g., local area network "LAN", the Internet, etc.) or computer system by rendering a uniform resource locator (URL) in the graphical user interface. When a user selects the uniform resource locator (e.g., by clicking on the uniform resource locator in the GUI with via a mouse), a conventional software application will retrieve content associated with the location specified by the uniform resource locator. This is commonly referred to as "hyperlinking" from the present document (word processing document, web browser, PDF document, etc.) to the remote location identified by the uniform resource locator. The content retrieved from the remote location can include data in various formats (e.g., hypertext markup language "HTML" documents, Flash files, PDF documents, etc.), directory information associated with a file system, network drive mappings, and the like.

Generally, a hyperlink is the graphical depiction of the remote location embodied as a uniform resource locator (e.g., "http://www.adobe.com") in a graphical user interface. Moreover, some conventional software applications have techniques for indicating to a user that a uniform resource locator is a hyperlink by providing a graphical cue. Common graphical cues for indicating hyperlinks in a document include, for example, underlining the uniform resource locator and/or displaying the uniform resource locator in a color distinct from other content in the document.

SUMMARY

Conventional software applications that enable users to interact with content in a document (e.g., word processing document, web browser, PDF document, etc.) suffer from a variety of deficiencies. In particular, conventional software applications that enable hyperlinking in a graphical user interface lack granularity and robust functionality in the implementation and presentation of such hyperlinking. For example, a hyperlink (e.g., represented as a uniform resource locator) in a conventional web browser does not allow a user to select (via an input device) discrete locations represented by subparts contained within the hyperlink. Instead, as in one example, when a user clicks on a hyperlink in a conventional web browser, the web browser only retrieves data from the remote location specified by the full address associated with the uniform resource locator.

As another example, suppose a hyperlink in a conventional word processing document displays the following uniform resource locator: "www.adobe.com/products-/illustrator/index.htm". With conventional software applications, a user may only visit (e.g., the software applications will only retrieve data from) the remote location specified by the address encapsulated by the entire uniform resource locator (e.g., the "index.html" file located in the "illustrator/" directory). As such, conventional software applications lack the granularity to allow a user to navigate to various distinct locations represented by subparts contained within the uniform resource locator. For example, in using the hyperlink previously mentioned, a user does not have the capability of navigating to (or retrieving data from) the "www.adobe.com/products/" location when using a conventional software application (e.g., a web browser). Instead, a user is typically forced to retype or copy and paste the subpart of the uniform resource locator (e.g., "www.adobe.com/products") into the address section of a web browser. This may prove especially frustrating when a uniform resource locator is directed to a broken link (e.g., due to rearrangement of directory structure, renaming of an HTML file, etc.). In such an instance, a user cannot easily navigate to parent directories within the uniform resource locator upon discovering the broken link that is referenced by the hyperlink.

A further deficiency involving conventional software applications results in an inability to graphically distinguish, within the uniform resource locator, the various subparts of the hyperlink. Although conventional software applications (e.g., word processors, etc.) may distinguish a hyperlink from other content in a graphical user interface (e.g., by underlining the hyperlink), the various discrete subparts of the hyperlink (e.g., related to the directory structure portrayed in the uniform resource locator) are not distinguishable from one another. Thus, users typically view hyperlinks in conventional software applications as an indivisible navigational tool that specifies only one referencable location (e.g., a single referenceable web page, network drive, directory, etc.).

Embodiments disclosed herein can significantly overcome such deficiencies and/or other deficiencies in the prior art. For example, embodiments herein include methods and apparatus for implementing a hyperlinking process that identifies distinct subparts of a uniform resource locator (e.g., to be used as a hyperlink) in a software application (e.g., web browser, word processor, etc.) such that a user of the software application can: a) distinguish between the various subparts, b) select the different referenceable subparts with an input device (e.g., mouse), and c) retrieve data associated with the remote location referenced by each subpart of the uniform resource locator. The hyperlinking process further displays the subparts of the uniform resource locator (e.g., in a web browser) in a manner that enables a user to distinguish between the various subparts before, during, and/or in response to user interaction with the uniform resource locator (e.g., by a user "mousing" over or clicking on or near the hyperlink).

In accordance with example embodiments, one or more subparts of a uniform resource locator can represent different layers in a hierarchical directory structure. For instance, subparts having a higher hierarchical order in the directory structure (e.g., parent directories) are graphically situated to the left of the subordinate subparts in the uniform resource locator. In using the example uniform resource locator discussed above, the "www.adobe.com/products" (or "products") subpart is located higher in the directory hierarchy than the "www.adobe.com/products/illustrator" (or "illustrator") subpart (or the "illustrator" subpart is subordinate to the "products" subpart). By enabling a user to select the various subparts of a uniform resource locator, the hyperlinking process therefore provides the user an opportunity to navigate through the directory structure represented by a single uniform resource locator. For example, a user has the flexibility to view and navigate to the "products" subpart in the above-mentioned uniform resource locator if, say, the user desires to peruse various Adobe products other than Adobe Illustrator™. Furthermore, the user also has the capability of navigating to the Adobe.com home page within the same uniform resource locator if desired.

In another example embodiment, the hyperlinking process graphically distinguishes the subparts of the uniform resource locator prior to user interaction with (e.g., via a mouse, either by mousing over or clicking) the uniform resource locator. In other words, such an example embodiment can involve the hyperlinking process rendering each subpart of the uniform resource locator in a distinct color before the user selects (e.g., mouses over) the graphical representation of the uniform resource locator.

In yet another embodiment, the hyperlinking process graphically distinguishes the subparts of the uniform resource locator in response to a user interacting with the graphical representation of the uniform resource locator. For instance, in one example embodiment the hyperlinking process selectively underlines each subpart of the uniform resource locator in response to a user interacting with (e.g., mousing over) the particular subpart. Furthermore, the user can provide further input (e.g., via a mouse click) with respect to a particular subpart such that the hyperlinking process retrieves content (e.g., navigates to a website) associated with that particular subpart.

In still yet another example embodiment, the hyperlinking process processes uniform resource locator data prior to rendering (or during the rendering of) the uniform resource locator in a graphical user interface. For example, in one embodiment the hyperlinking process parses the data associated with a uniform resource locator in order to identify the various distinct subparts of the uniform resource locator. The hyperlinking process may, for example, detect specific delimiters in a uniform resource locator that indicate a distinction between adjacent subparts in the uniform resource locator (e.g., a forward slash '/' is a typical delimiter in accordance with example embodiments, however other delimiters may also be utilized). In using the example uniform resource locator discussed above, the hyperlinking process parses the uniform resource locator and identifies the various subparts (e.g., "www.adobe.com", "products", "illustrator" and "index.htm") by detecting the forward slash '/' delimiters in accordance with a sample embodiment.

In yet another example embodiment, the hyperlinking process receives preconfigured data relating to a uniform resource locator. Generally, as in one embodiment, the preconfigured data contains pre-processed (or pre-parsed) uniform resource locator subpart data with respect to a particular uniform resource locator. A separate user (e.g., programmer), process and/or application may generate the preconfigured data for use by the hyperlinking process. It should be noted that the hyperlinking process may receive the preconfigured data from a local resource (e.g., local hard drive) or from a remote resource located across a network (e.g., LAN, Internet, etc.).

In another embodiment, the hyperlinking process dynamically generates incrementally hyperlinked uniform resource locators as a user enters data into a graphical user interface (e.g., types a uniform resource locator into an address bar of a web browser, word processing document, etc.). In such a case where a user enters a long and complex uniform resource locator into the address bar of a web browser, the hyperlinking process dynamically generates an incrementally hyperlinked uniform resource locator (e.g., parses the various subparts while the user is typing the uniform resource locator and enables those subparts to be separately referenced) such that a user can easily go back to various stages of his/her navigation within the website.

Still yet another advantage of providing incremental uniform resource locators (e.g., enabling referenceable subparts of the uniform resource locator) is for use in small devices such as cellular phones, personal digital assistants (PDAs), etc. In such small devices, the associated graphical user interfaces are also relatively small and are not conducive for displaying large hyperlinks. Thus, incremental hyperlinking may save space in such small graphical user interfaces and, as a result, provide a more user-friendly interface for operation of these smaller devices.

More specifically, in accordance with embodiments disclosed herein, a hyperlinking process identifies a uniform resource locator within content (e.g., within a word processing document, web page, Flash document, etc.). The hyperlinking process further identifies a hyperlink within the content. In this mariner, the hyperlink is operable to reference a location such as, for example, a website on the Internet, a local directory on a personal computer, a drive on a network, and/or other similar referenceable locations accessible by a computer.

Additionally, in accordance with an example embodiment, the hyperlinking process identifies a uniform resource identifier within the content and/or an internationalized resource identifier within the content. Furthermore, the hyperlinking process identifies a plurality of subparts of the uniform resource locator. Typically, each subpart represents a distinct location separately referenceable from a location referenced by the entire uniform resource locator.

Furthermore, the hyperlinking process receives (e.g., from a user of the document, web page, etc.) a selection of a subpart of the uniform resource locator that identifies a selected subpart. In response to the selection of the subpart, the hyperlinking process references the distinct location associated with the selected subpart.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Adobe Systems Incorporated of San Jose, Calif.

As discussed above, techniques herein are well suited for use in distribution and configuration of a video editor application. However, it should be noted that embodiments herein are not limited to use in such applications and that the techniques discussed herein are well suited for other applications as well.

Note that each of the different features, techniques, configurations, etc. discussed herein can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments herein include methods and apparatus for implementing a hyperlinking process 150-2 that identifies distinct subparts of a uniform resource locator (e.g., to be used as a hyperlink) in a software application (e.g., web browser, word processor, etc.) such that a user of the software application can select the different subparts with an input device (e.g., mouse). The hyperlinking process 150-2 further displays the subparts of the uniform resource locator (e.g., in a web browser) in a manner that enables a user to distinguish between the various subparts.

Embodiments further describe the hyperlinking process 150-2 graphically distinguishing the subparts of the uniform resource locator prior to user interaction (e.g., via a mouse) with the uniform resource locator. More specifically, such an example embodiment includes methods for rendering each subpart of the uniform resource locator in a distinct color before the user selects (e.g., mouses over) the graphical representation of the uniform resource locator.

In another example embodiment, the hyperlinking process 150-2 graphically distinguishes the subparts of the uniform resource locator in response to a user interacting with the graphical representation of the uniform resource locator. As per one example embodiment, the hyperlinking process 150-2 selectively underlines each subpart of the uniform resource locator in response to a user interacting with (e.g., mousing over, wherein the graphical representation of the mouse is within a predetermined distance from the graphical representation of the uniform resource locator) the particular subpart. The user can provide further input (e.g., via a mouse click) with respect to a particular subpart such that the hyperlinking process 150-2 retrieves content (e.g., navigates to a website, file system directory, etc.) associated with the particular subpart.

In accordance with example embodiments described herein, one or more subparts of a uniform resource locator can represent different layers in a hierarchical directory structure. For example, subparts having a higher hierarchical order in the directory structure (e.g., parent directories) are graphically situated to the left of the subordinate subparts in the uniform resource locator. By enabling a user to select the various subparts of a uniform resource locator, the hyperlinking process therefore provides the user an opportunity to navigate through the directory structure represented by a single uniform resource locator.

Figure 1:
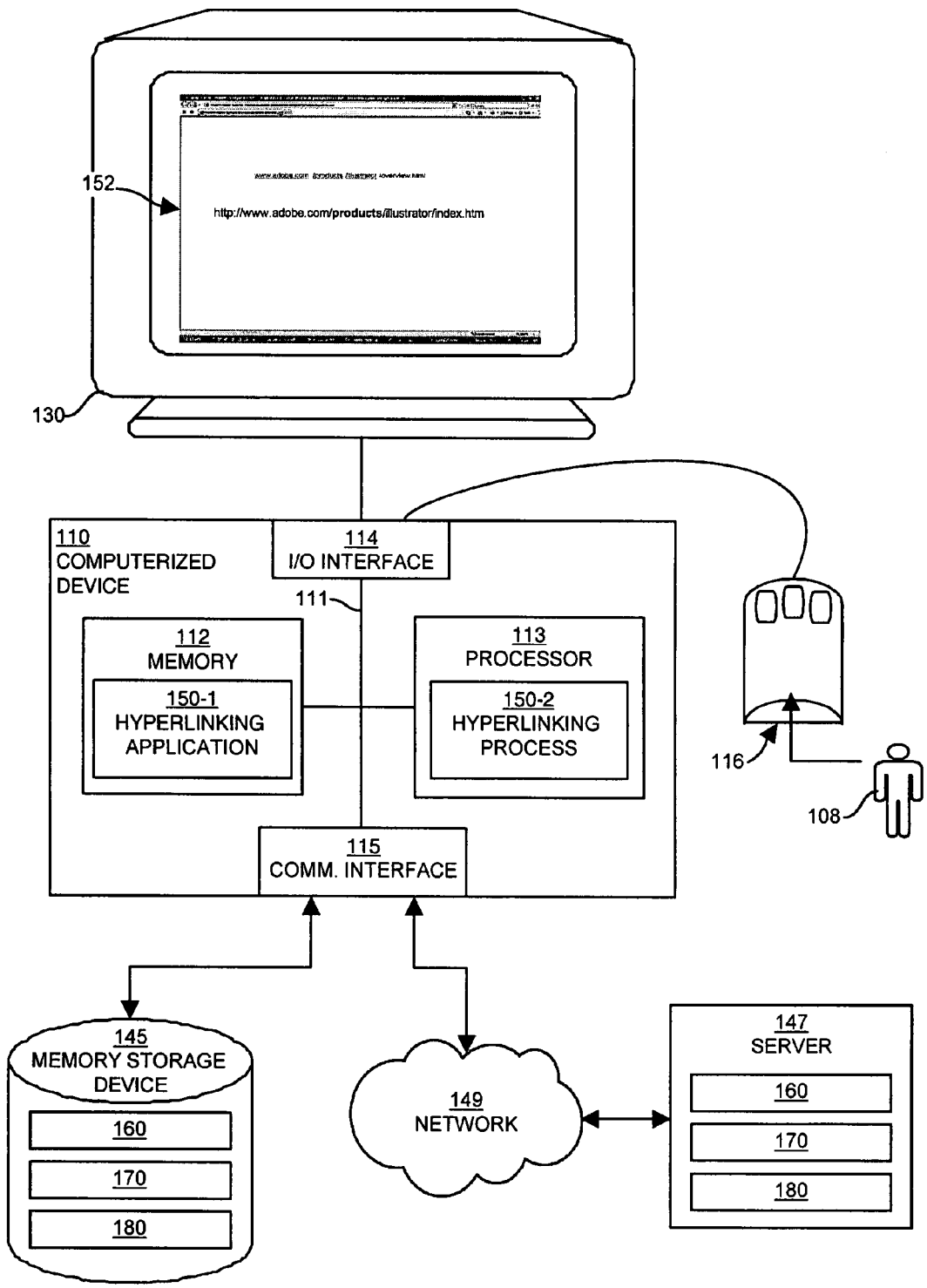
FIG. 1 is an example block diagram of a computerized system configured with an application including a hyperlinking process in communication with a server across a network in accordance with one example configuration according to embodiments herein.

FIG. 1 is a block diagram illustrating example architecture of a computer system 110 that executes, runs, interprets, operates or otherwise performs a hyperlinking application 150-1 and hyperlinking process 150-2. The computer system 110 may be any type of computerized device such as a personal computer, workstation, portable computing device, console, laptop, network terminal, client, etc. As shown in this example, the computer system 110 includes an interconnection mechanism 111 such as a data bus or other circuitry that couples a memory system 112, a processor 113, an input/output interface 114, and a communications interface 115. An input device 116 (e.g., one or more user/developer controlled devices such as a pointing device, keyboard, mouse, etc.) couples to processor 113 through I/O interface 114, and enables a user 108 to provide input commands and generally control the display 130. The communications interface 115 enables the computer system 110 to communicate with other devices (e.g., other computers such as server 147) over a respective a network 149 (e.g., a local area network, the Internet, etc.).

The memory system 112 can generally be any type of computer readable medium and (in this example) is encoded with a hyperlinking application 150-1. The hyperlinking application 150-1 may be embodied as software code such as data and/or logic instructions (e.g., code stored in the memory or on another computer readable medium such as a removable disk) that supports processing functionality according to different embodiments described herein.

During operation of the computer system 110, the processor 113 accesses the memory system 112 via the interconnect 111 in order to launch, run, execute, interpret or otherwise perform the logic instructions of the hyperlinking application 150-1. Execution of hyperlinking application 150-1 in this manner produces processing functionality in a hyperlinking process 150-2. In other words, the hyperlinking process 150-2 represents one or more portions of runtime instances of the hyperlinking application 150-1 (or the entire hyperlinking application 150-1) performing or executing within or upon the processor 113 in the computerized device 110 at runtime.

The computer system 110 is further in communication with a local memory storage device 145 (e.g., hard disk, removeable media, etc.). The storage device 145 contains data (e.g., word documents, uniform resource locator data 160, preconfigured uniform resource locator data 170, referenceable content 180, etc.) that is accessible by the hyperlinking application 150-1 during a runtime instance of the hyperlinking process 150-2. It should be noted that server 147 may also contain similar data (e.g., web pages, URL data 160, preconfigured URL data 170, referenceable content 180, etc.) accessible by the hyperlinking application 150-1 from across network 147 (e.g., LAN, Internet, etc.).

Figure 2:
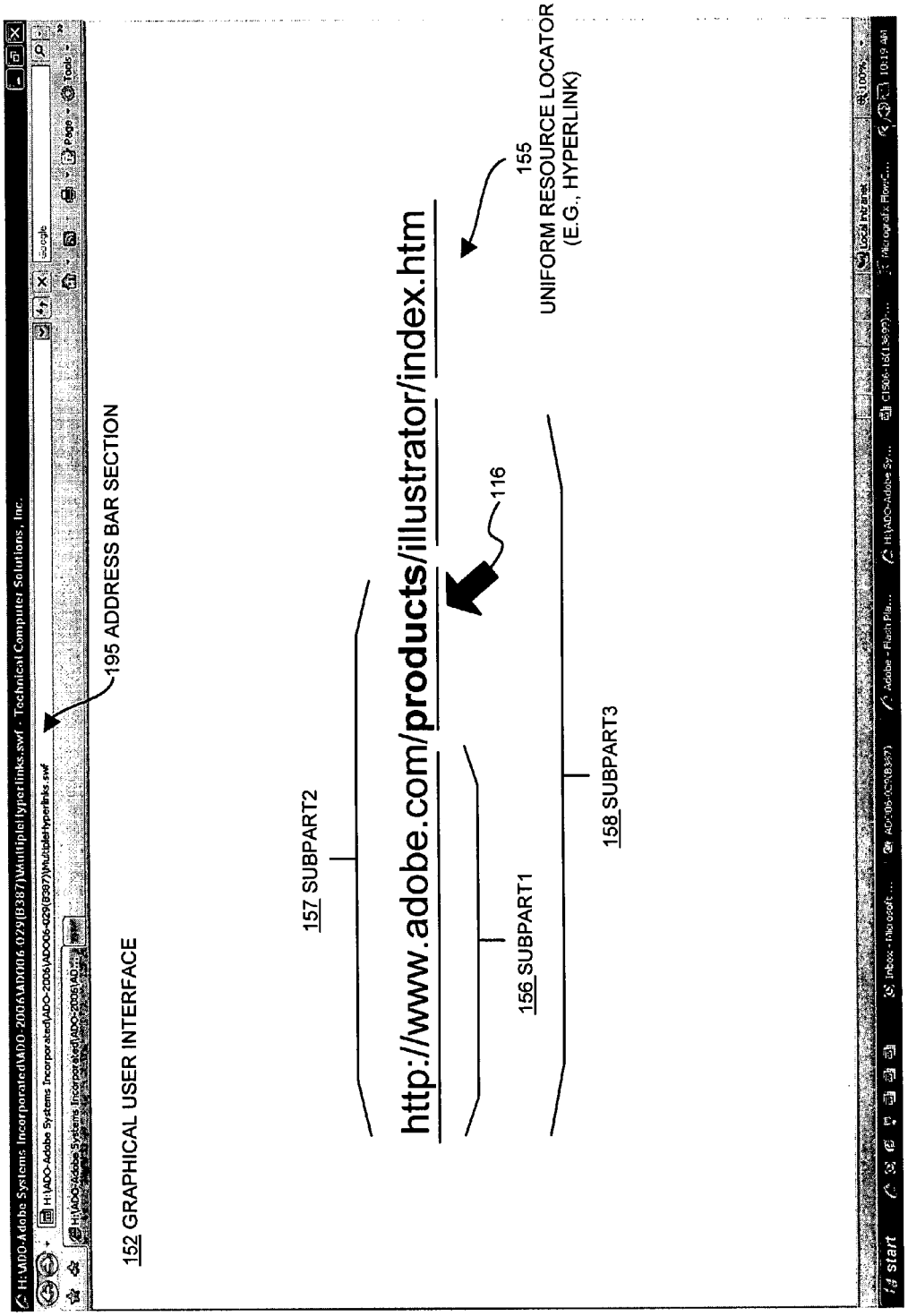
FIG. 2 illustrates a graphical user interface comprising a uniform resource locator in accordance with one example configuration according to embodiments herein.

FIG. 2 illustrates an example configuration of the hyperlinking process 150-2 rendering a graphical user interface 152 in the display 130 of computing system 110. The graphical user interface 152 may be, for example, a word processor application, a web browser, a PDF document being viewed in Adobe Acrobat™, an interactive instantiation of a Flash file, or an email message, just to name a few. A graphical representation of a mouse icon 116 is also shown in graphical user interface 152 as a black arrow. The mouse icon is operable to, for example, scroll over (or "mouse" over), click on (e.g., double click, right click, etc.), and/or highlight content within the graphical user interface 152.

Still referring to FIG. 2, the hyperlinking process 150-2 renders a uniform resource locator 155 ("http://www.adobe-.com/products/illustrator/index.htm" in this example embodiment) operable for use as a hyperlink in graphical user interface 152. In particular, the uniform resource locator 155 includes three distinct referenceable subparts (e.g., Subpart1 156, Subpart2 157 and Subpart3 158) that are indicated by brackets in FIG. 2. It should be noted that the uniform resource locator 155 can be located anywhere in the graphical user interface 152 that enables a user 106 to interact with the content. For example, a uniform resource locator 155 in FIG. 2 can also be graphically located in the address bar section 195 of the graphical user interface 152 (e.g., where the graphical user interface 152 is a web browser such as Internet Explorer™).

Figure 3:
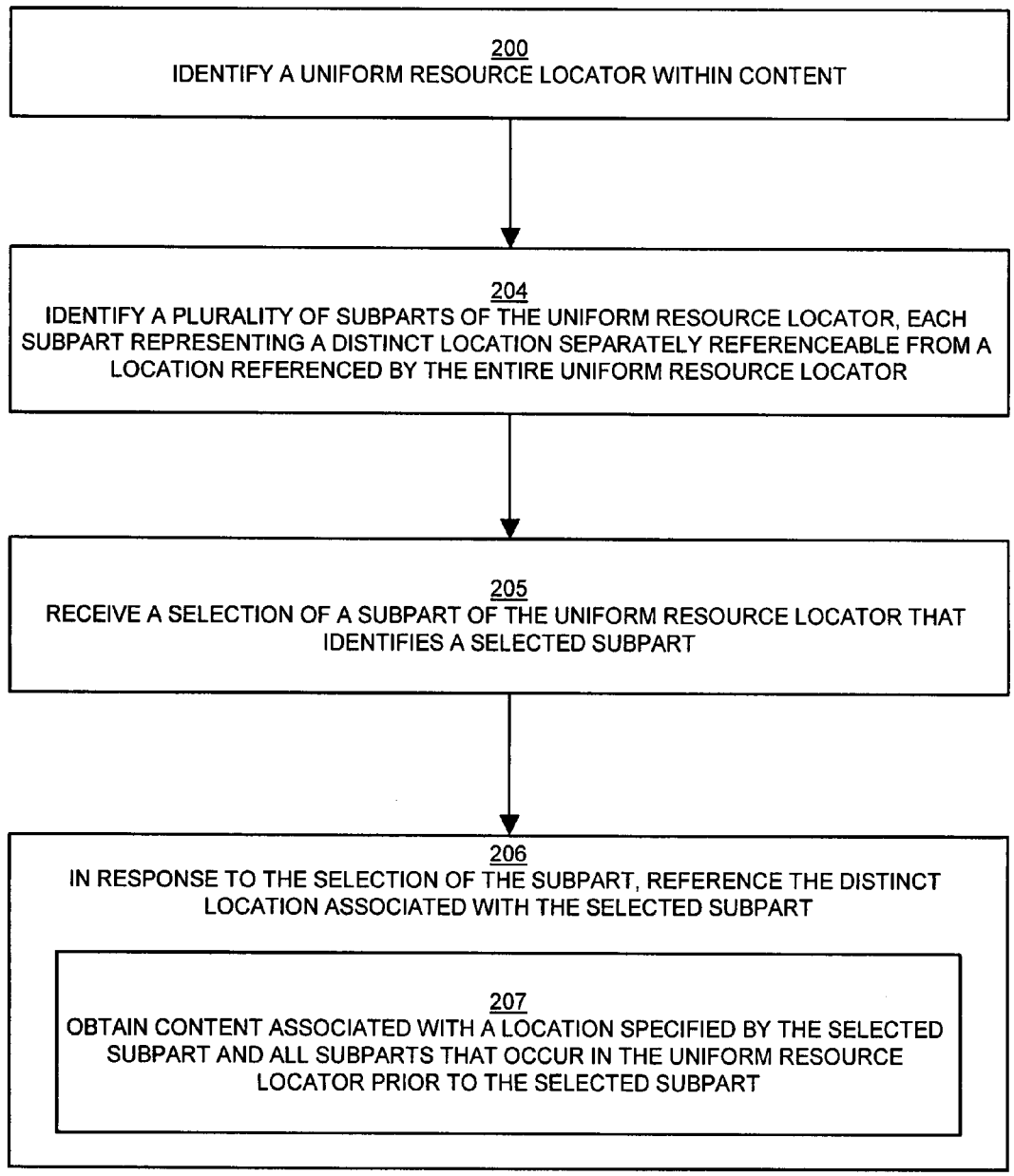
FIG. 3 is a flow chart of processing steps performed by a hyperlinking process according to embodiments herein.
Figure 4:
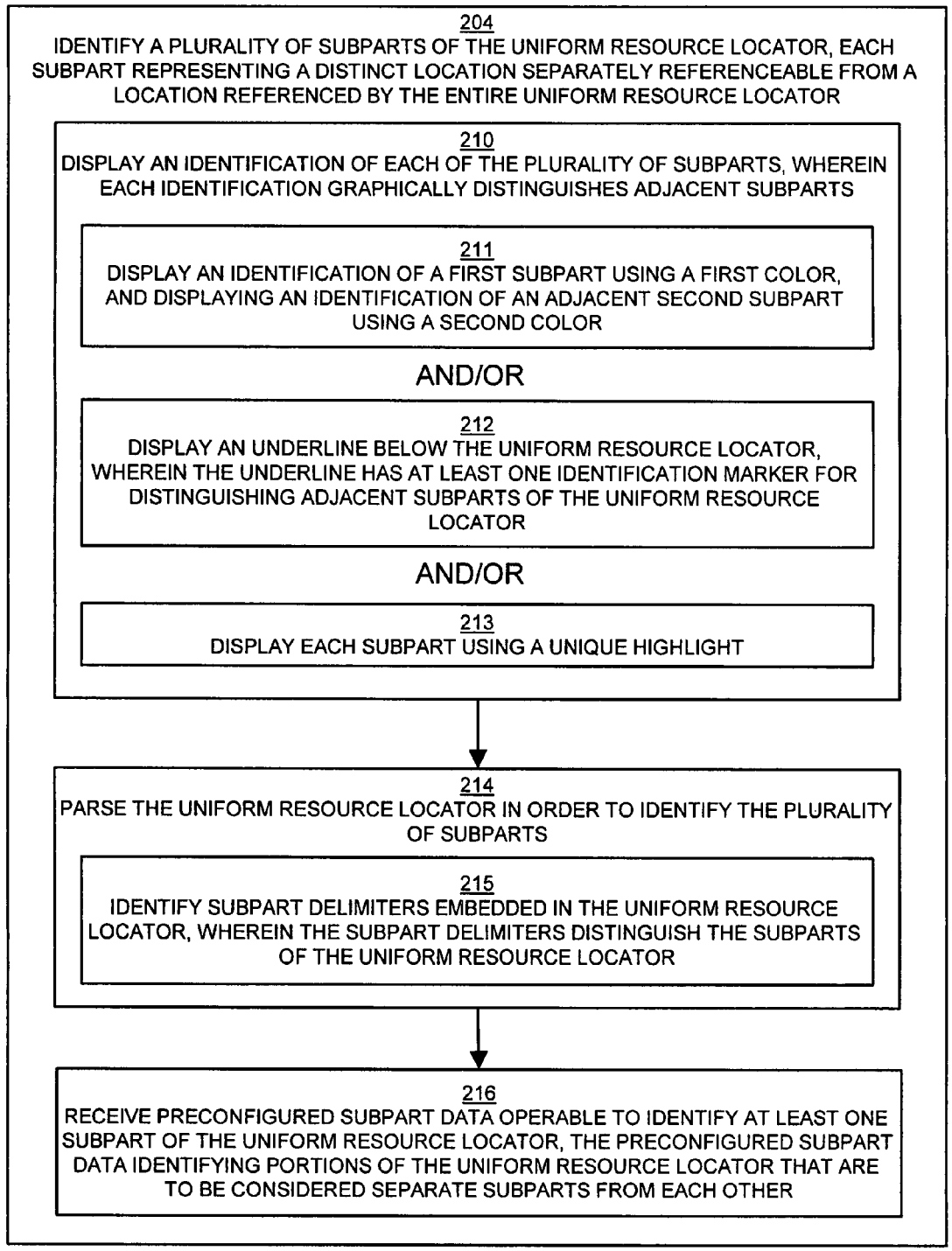
FIG. 4 is a flow chart of processing steps performed by a hyperlinking process according to embodiments herein.
Figure 5:
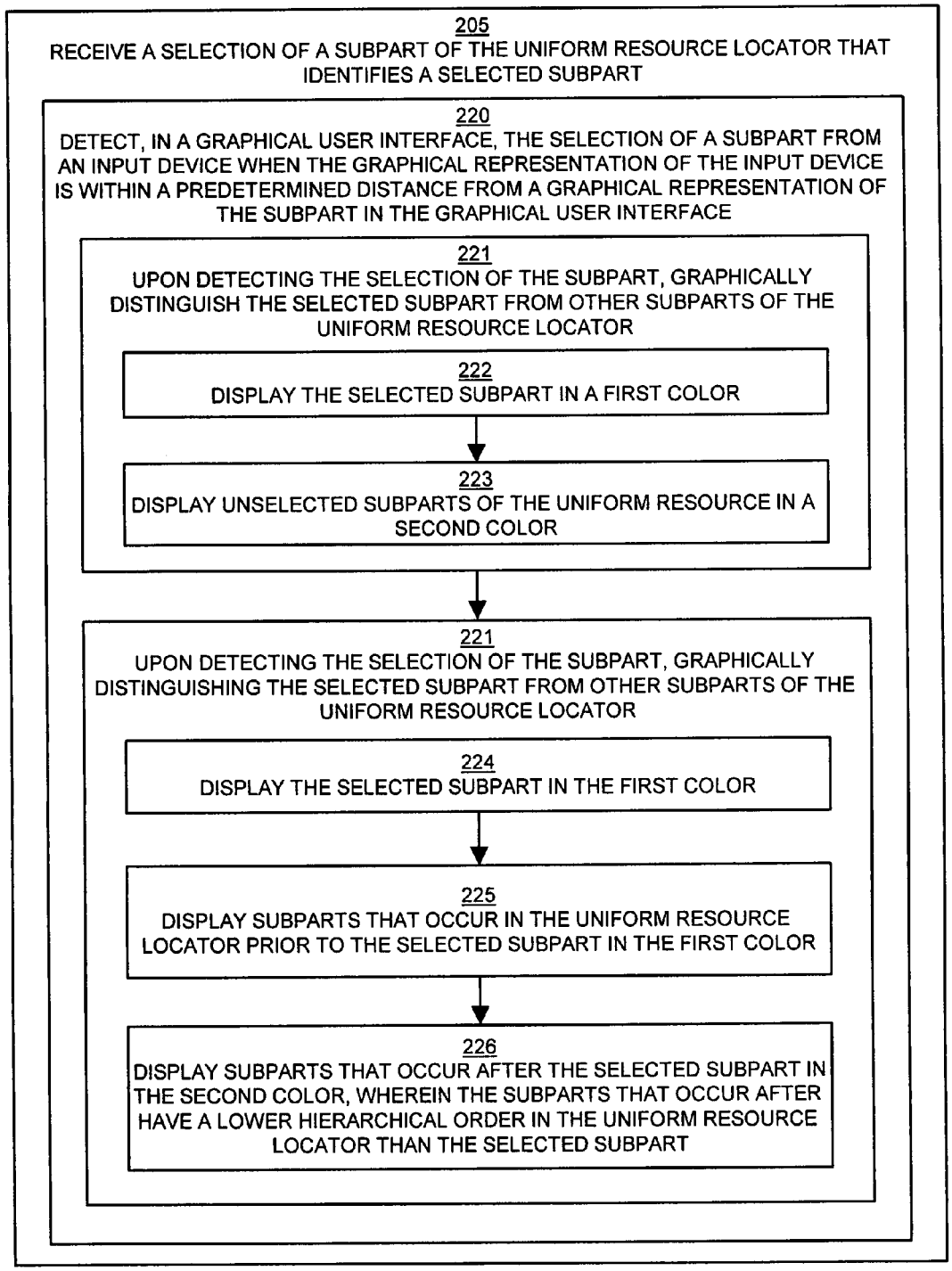
FIG. 5 is a flow chart of processing steps performed by a hyperlinking process according to embodiments herein.

FIGS. 3-5 present flow charts according to embodiments herein. The rectangular elements are herein denoted "steps" and represent computer software instructions or groups of instructions. The flow diagrams do not necessarily depict the syntax of any particular programming language. Rather, the flow diagrams illustrate the functional information one of ordinary skill in the art could use to fabricate circuits or to generate computer software to perform the processing required in accordance with the present invention.

It should be noted that many routine program elements, such as initialization of loops and variables and the use of temporary variables are inherent in the flowcharts. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Now, more specifically, FIG. 3 is a flow chart of processing steps performed by a hyperlinking process according to embodiments herein.

In step 200, the hyperlinking process 150-2 identifies a uniform resource locator 155 within content. FIG. 1 depicts an example embodiment where the hyperlinking process 150-2 has identified the uniform resource locator 155 in content (e.g., within the web page shown in FIG. 1) and has rendered the uniform resource locator 155 in the graphical user interface 152. In particular, the example embodiment of FIG. 1 shows the uniform resource locator 155 rendered as "www.adobe.com/products/illustrator/-index.htm". Additionally, in referring to FIG. 1, the uniform resource locator process 150-2 may identify the uniform resource locator 155 from uniform resource locator data 160 stored locally in memory storage device 145 and/or from uniform resource locator data 160 stored in remote server 147 across network 149 (e.g., the Internet).

In accordance with another example embodiment, the hyperlinking process 150-2 identifies a hyperlink, a uniform resource identifier, and/or an internationalized resource identifier within the content. In this manner, the hyperlink, uniform resource identifier, and/or the internationalized resource identifier are operable to reference a location (e.g., a separate web page from a remote server). Similar to step 200, and still referring to FIG. 1, the uniform resource locator process 150-2 may identify the a hyperlink, uniform resource identifier and/or the internationalized resource identifier from the uniform resource locator data 160 stored locally in memory storage device 145 and/or from uniform resource locator data 160 stored in remote server 147 across network 149 (e.g., the Internet).

In step 204, the hyperlinking process 150-2 identifies a plurality of subparts of the uniform resource locator. Each subpart (e.g., Subpart1 156, Subpart2 157 and Subpart3 158) in this example embodiment represents a distinct location separately referenceable from a location referenced by the entire uniform resource locator 155. For example, Subpart1 156 represents a distinct location (e.g., "www.adobe.com") that is separately referenceable from the entire uniform resource locator 155 (e.g., "www.adobe.com/-products/illustrator/index.htm") such that Subpart1 156 references a separate directory in the Adobe.com server directory structure.

In step 205, the hyperlinking process 150-2 receives a selection of a subpart of the uniform resource locator 155 that identifies a selected subpart (e.g., Subpart1 156). As shown in the example embodiment of FIG. 1, the user 108 selects Subpart2 157 of uniform resource locator 155 with input device 116 (as represented by the mouse icon in FIG. 1). The hyperlinking process 150-2 may receive the selection of a subpart by detecting the mouse icon within a certain distance (or certain proximity with respect to pixels) from the graphical representation of the uniform resource locator 155, or the user 108 may click on the uniform resource locator 155 using the mouse input device 116.

In step 206, the hyperlinking process 150-2, in response to the selection of the subpart (e.g., Subpart2 157), references the distinct location associated with the selected subpart. For example, the hyperlinking process 150-2 in FIG. 1 references the location associated with Subpart2 157 (e.g., "products") in response to the user 108 selecting Subpart2 157 with the mouse input device 116.

In step 207, the hyperlinking process 150-2 obtains content associated with a location specified by the selected subpart and all subparts that occur in the uniform resource locator 155 prior to the selected subpart. In using the example from steps 205 and 206, the hyperlinking process 150-2 obtains content (e.g., referenceable content 180) associated with a location specified by the selected subpart (e.g., Subpart2 157 "products") and all subparts that occur in the uniform resource locator 155 prior to Subpart2 157. Thus, since Subpart1 156 (e.g., "www.adobe.com") occurs prior to Subpart2 157 in uniform resource locator 155, the hyperlinking process 150-2 references the location associated with the concatenation of Subpart2 157 to the end of Subpart1 156 (e.g., "www.adobe.com/products").

FIG. 4 is a flow chart of processing steps performed by a hyperlinking process according to embodiments herein.

In step 210, the hyperlinking process 150-2 displays an identification of each of the plurality of subparts. In this manner, each subpart identification graphically distinguishes adjacent subparts. The subpart identifications can be graphically distinguished using various techniques such as, but not limited to, separately underlining each subpart as shown in FIG. 1, displaying every other subpart using bold and/or italic font styles, displaying subparts in different font and/or font sizes, and/or displaying various subparts in different colors and/or highlights.

In step 211, the hyperlinking process 150-2 displays an identification of a first subpart using a first color (e.g., displaying Subpart1 156 in blue) and displays an identification of an adjacent second subpart using a second color (e.g., displaying Subpart2 157 in red).

In step 212, the hyperlinking process 150-2 displays an underline below the uniform resource locator 155, wherein the underline has at least one identification marker for distinguishing adjacent subparts of the uniform resource locator 155. FIG. 1 depicts an example embodiment where the hyperlinking process 150-2 displays a segmented underline under each subpart such that there is a space or gap between each subpart underline. In another example embodiment, the hyperlinking process 150-2 displays a divot or squiggle line between each subpart underline to graphically distinguish each subpart.

In step 213, the hyperlinking process 150-2 displays each subpart using a unique highlight. For example, in one embodiment the hyperlinking process 150-2 displays Subpart1 156 using a blue highlight, Subpart2 157 using a red highlight and Subpart3 using a yellow highlight.

In step 214, the hyperlinking process 150-2 parses the uniform resource locator in order to identify the plurality of subparts. The hyperlinking process 150-2 may detect or interpret predefined declarative tags in the uniform resource locator data 160 that distinguish each subpart from one another in accordance with one example embodiment.

In step 215, the hyperlinking process 150-2 identifies subpart delimiters embedded in the uniform resource locator 155, wherein the subpart delimiters distinguish the subparts of the uniform resource locator 155. According to one example embodiment, the hyperlinking process 150-2 detects forward slashes '/' as the subpart delimiters in order to distinguish the subparts of the uniform resource locator 155.

In another example embodiment, the hyperlinking process 150-2 dynamically parses user input in the graphical user interface 152 to identify delimiters (e.g., forward slashes '/') that distinguish adjacent subparts of the uniform resource locator 155 while the user 108 actively inputs data associated with the uniform resource locator 155. For example, in one embodiment the hyperlinking process 150-2 dynamically parses a uniform resource locator while a user 108 is typing the uniform resource locator into the address bar of a web browser. While parsing the uniform resource locator in the address bar of the web browser, the hyperlinking process 150-2 is able to distinguish adjacent subparts and render those adjacent subparts in a graphically distinguishable manner.

In step 216, the hyperlinking process 150-2 receives preconfigured subpart data 170 that identifies at least one subpart of the uniform resource locator 155. The preconfigured subpart data 170 identifies portions of the uniform resource locator 155 that are to be considered separate subparts from each other. Moreover, the preconfigured subpart data 170 may be received from a user or process working locally on computer system 110 or remotely on, for example, server 147.

Example embodiments of a Flash file encoded in a certain format and language that contains preconfigured subpart data are shown below in Table I. A separate user, process and/or application can modify the preconfigured subpart data by using tags and properties that are defined by the specific file format and language.

TABLE I

```
Example 1:
var myformat:TextFormat = new TextFormat( );
myformat.url =
"http://www.macromedia.com/support/documentation/
tings_manager04a.html";
// New Tag - Signifies that the renderer should automatically enable
incremental hyperlinking for this string.
myformat.enableAutoIncrementalHyperlinking = true;
Example 2:
var myformat:TextFormat = new TextFormat( );
myformat.url = "http://www.macromedia.com/flash"
// New Tag - Signifies that the renderer should automatically enable
incremental hyperlinking for this string.
myformat.enableAutoIncrementalHyperlinking = true;
//New Tags - subpart-2-URL mapping
myFormat.subUrl1 = "http://www.macromedia.com"
// maps to the string "http://www.macromedia.com"
myFormat.subUrl2 = "http://www.macromedia.com/products/
flash" // maps to the string "http://www.macromedia.com/flash"
```

FIG. 5 is a flow chart of processing steps performed by a hyperlinking process according to embodiments herein.

In step 220, the hyperlinking process 150-2 detects, in the graphical user interface 152, the selection of a subpart from an input device 116 (e.g., mouse) when the graphical representation of the input device 116 is within a predetermined distance from a graphical representation of the subpart in the graphical user interface 152. For example, in FIG. 1 the hyperlinking process 150-2 detects the selection of Subpart2 157 when the graphical representation of input device 166 (e.g., mouse icon) is within a predetermined distance (e.g., 10 pixels) of the graphical representation of Subpart2 157 (e.g., "products") in graphical user interface 152.

In step 221, the hyperlinking process 150-2, upon detecting the selection of the subpart, graphically distinguishes the selected subpart from other subparts of the uniform resource locator. As an example, the hyperlinking process in FIG. 1 graphically distinguishes Subpart2 157 by underlining the graphical representation of Subpart2 157 (e.g., "products") and by displaying Subpart2 157 using bold characters.

In step 222, the hyperlinking process 150-2 displays the selected subpart in a first color (e.g., displays Subpart2 157 in red).

In step 223, the hyperlinking process 150-2 displays unselected subparts of the uniform resource in a second color (e.g., displays Subpart1 156 "www.adobe.com" and Subpart3 158 "illustrator" in blue).

In steps 224 and 225, the hyperlinking process 150-2 displays the selected subpart in the first color and also displays subparts that occur in the uniform resource locator prior to the selected subpart in the first color. For example, the hyperlinking process 150-2, in response to receiving user selection of Subpart2 157, displays Subpart2 157 and prior occurring Subpart1 156 in a first color (e.g., blue) such that "www.adobe.com/products" is displayed in the same color. This method is used to graphically distinguish the entire address of the subpart where the user 108 desires to be redirected.

In step 226, the hyperlinking process 150-2 displays subparts that occur after the selected subpart in the second color, wherein the subparts that occur after have a lower hierarchical order in the uniform resource locator than the selected subpart. In using the example of steps 224 and 225, the hyperlinking process 150-2 displays the lower subparts in the uniform resource locator hierarchy (e.g., Subpart3 158) in a second color (e.g., yellow). In some instances, the hyperlinking process may also display any content in the uniform resource locator that occurs after the last subpart in the uniform resource locator 155 (e.g., Subpart 158 being the last subpart of uniform resource locator 155 in FIG. 1). According to the example embodiment of FIG. 1, the hyperlinking process may also display the "index.htm" content in the same color as the last occurring subpart (e.g., yellow in this example embodiment).

Those skilled in the art should readily appreciate that the programs and methods for multiple hyperlinks in a uniform resource locator defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines.

The disclosed method may be in the form of an encoded set of processor based instructions for performing the operations and methods discussed above. Such delivery may be in the form of a computer program product having a computer readable medium operable to store computer program logic embodied in computer program code encoded thereon, for example. The operations and methods may be implemented in a software executable object. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for multiple hyperlinks in a uniform resource locator has been particularly shown and described with references to embodiments thereof, it will be understood by those skilled in the art that various changes in form and details may be made therein without departing from the scope of the invention encompassed by the appended claims.

What I claim is:

1. A method comprising:

Identifying a uniform resource locator;

Identifying a plurality of subparts of the uniform resource locator (URL), wherein identifying the plurality of subparts includes: displaying, on a display screen, each subpart as a respective portion of a selectable instance of the URL, wherein each subpart in the selectable instance of the URL comprises an individually selectable link for retrieving content currently stored at a distinct location, wherein content retrieved upon selection of any individually selectable link comprises content different than content retrieved upon receiving selection of the entire selectable instance of the URL;

Receiving a selection of a subpart displayed as part of the selectable instance of the URL; and In response to the selection of the subpart displayed as part of the selectable instance of the URL, referencing the distinct location associated with the selected subpart, wherein referencing the distinct location includes retrieving the content currently stored at the distinct location; Wherein identifying the uniform resource locator includes: receiving each of the subparts from at least one source;

Wherein identifying the plurality of subparts includes: during receipt of the plurality of subparts, rendering at least one of the subparts as a first individually selectable link for retrieving first content currently stored at a first distinct location Wherein rendering the at least one of the subparts as a first individually selectable link includes: activating the at least one of the subparts as a live reference to content currently stored at a first distinct location Wherein activating the at least one of the subparts in activating the at least one of the subparts includes: receiving a first subpart prior to receiving a second subpart;

and as at least one portion of the second subpart is received, providing a functionality for retrieving the content currently stored at the first distinct location upon detecting selection of the first subpart.

2. The method of claim 1 wherein identifying a plurality of subparts of the uniform resource locator comprises: displaying an identification of each of the plurality of subparts, wherein each identification graphically distinguishes adjacent subparts.

3. The method of claim 2 wherein displaying an identification of each of the plurality of subparts comprises at least one of:

displaying an identification of a first subpart using a first color, and displaying an identification of an adjacent second subpart using a second color;

displaying an underline below the uniform resource locator, wherein the underline has at least one identification marker for distinguishing adjacent subparts of the uniform resource locator; and displaying each subpart using a unique highlight.

4. The method of claim 1 wherein parsing the uniform resource locator comprises:

identifying subpart delimiters embedded in the uniform resource locator, wherein the subpart delimiters distinguish the subparts of the uniform resource locator.

5. The method of claim 1 wherein identifying a plurality of subparts of the uniform resource locator comprises: receiving preconfigured subpart data operable to identify at least one subpart of the uniform resource locator, the preconfigured subpart data identifying portions of the uniform resource locator that are to be considered separate subparts from each other.

6. The method of claim 1 wherein receiving a selection of a subpart of the uniform resource locator comprises: detecting, in a graphical user interface, the selection of a subpart from an input device when the graphical representation of the input device is within a predetermined distance from a graphical representation of the subpart in the graphical user interface.

7. The method of claim 6 comprising: upon detecting the selection of the subpart, graphically distinguishing the selected subpart from other subparts of the uniform resource locator.

8. The method of claim 7 wherein graphically distinguishing the selected subpart from other subparts of the uniform resource locator comprises: displaying the selected subpart in a first color; and displaying unselected subparts of the uniform resource in a second color.

9. The method of claim 7 wherein graphically distinguishing the selected subpart from other subparts of the uniform resource locator comprises:

displaying the selected subpart in the first color;

displaying subparts that occur in the uniform resource locator prior to the selected subpart in the first color;

and displaying subparts that occur after the selected subpart in the second color, wherein the subparts that occur after have a lower hierarchical order in the uniform resource locator than the selected subpart.

10. The method of claim 1 wherein identifying a uniform resource locator within content comprises at least one of:
Identifying a hyperlink within the content, the hyperlink operable to reference a location;
Identifying a uniform resource identifier within the content, the uniform resource identifier operable to reference a location; and
Identifying an internationalized resource identifier within the content, the internationalized resource identifier operable to reference a location.

11. The method of claim 1 wherein identifying a plurality of subparts of the uniform resource locator comprises: dynamically parsing user input in a graphical user interface to identify delimiters that distinguish adjacent subparts of the uniform resource locator while the user actively inputs data associated with the uniform resource locator.

12. A method comprising:
Identifying a uniform resource locator within a document;
Parsing the uniform resource locator (URL) to identify a plurality of subparts within the uniform resource locator;
Displaying the uniform resource locator in a graphically distinguishing manner to enable a user of the document to distinguish between each subpart of the uniform resource locator, wherein displaying the URL includes:
Displaying a selectable instance of the URL on a display screen, wherein displaying the selectable instance of the URL includes: displaying each subpart as a respective portion of the selectable instance of the URL, wherein each subpart in the selectable instance of the URL comprises an individually selectable link for retrieving content currently stored at a distinct location, wherein content retrieved upon selection of any individually selectable link comprises content different than content retrieved upon receiving selection of the entire selectable instance of the URL;
Receiving a selection of a subpart displayed as part of the selectable instance of the URL; and
In response to the selection of the subpart displayed as part of the selectable instance of the URL, referencing the distinct location associated with the selected subpart, wherein referencing the distinct location includes retrieving the content currently stored at the distinct location;
Wherein identifying the uniform resource locator includes: receiving each of the subparts from at least one source;
Wherein identifying the plurality of subparts includes: during receipt of the plurality of subparts, rendering at least one of the subparts as a first individually selectable link for retrieving first content currently stored at a first distinct location
Wherein rendering the at least one of the subparts as a first individually selectable link includes: activating the at least one of the subparts as a live reference to content currently stored at a first distinct location
Wherein activating the at least one of the subparts in activating the at least one of the subparts includes: receiving a first subpart prior to receiving a second subpart;
and as at least one portion of the second subpart is received, providing a functionality for retrieving the content currently stored at the first distinct location upon detecting selection of the first subpart.

13. A method comprising:
Identifying a uniform resource locator within a document;
Parsing the uniform resource locator (URL) to identify a plurality of subparts within the uniform resource locator;
Displaying the uniform resource locator and graphically distinguishing each subpart of the uniform resource locator, wherein displaying the URL includes:
Displaying a selectable instance of the URL on a display screen, wherein displaying the selectable instance of the URL includes: displaying each subpart as a respective portion of the selectable instance of the URL, wherein each subpart in the selectable instance of the URL comprises an individually selectable link for retrieving content currently stored at a distinct location, wherein content retrieved upon selection of any individually selectable link comprises content different than content retrieved upon receiving selection of the entire selectable instance of the URL;
Receiving a selection of a subpart of the uniform resource locator;
Displaying, in a graphical user interface, the selected subpart to graphically distinguish the selected subpart from other subparts in the uniform resource locator; and
In response to the selection of the subpart, referencing the distinct location associated with the selected subpart, the distinct location being different than a location referenced by the entire uniform resource locator, wherein referencing the distinct location includes retrieving the content currently stored at the distinct location;
Wherein identifying the uniform resource locator includes: receiving each of the subparts from at least one source;
Wherein identifying the plurality of subparts includes: during receipt of the plurality of subparts, rendering at least one of the subparts as a first individually selectable link for retrieving first content currently stored at a first distinct location
Wherein rendering the at least one of the subparts as a first individually selectable link includes: activating the at least one of the subparts as a live reference to content currently stored at a first distinct location
Wherein activating the at least one of the subparts in activating the at least one of the subparts includes: receiving a first subpart prior to receiving a second subpart; and as at least one portion of the second subpart is received, providing a functionality for retrieving the content currently stored at the first distinct location upon detecting selection of the first subpart.

14. A computerized device comprising:
A memory;
A processor;
A communication interface;
An interconnection mechanism coupling the memory, the processor and the communications interface; and
Wherein the memory is encoded with a hyperlinking application that when executed on the processor provides a hyperlinking process causing the computerized device to be capable of performing the operations of:
Identifying a uniform resource locator;
Identifying a plurality of subparts of the uniform resource locator (URL), wherein identifying the plurality of subparts includes: displaying, on a display screen, each subpart as a respective portion of a selectable instance of the URL, wherein each subpart in the selectable instance of the URL comprises an individually selectable link for retrieving content currently stored at a distinct location, wherein content retrieved upon selection of any individually selectable link comprises content different than content retrieved upon receiving selection of the entire selectable instance of the URL;

Receiving a selection of a subpart displayed as part of the selectable instance of the URL; and In response to the selection of the subpart displayed as part of the selectable instance of the URL, referencing the distinct location associated with the selected subpart, wherein referencing the distinct location includes retrieving the content currently stored at the distinct location;

Wherein identifying the uniform resource locator includes: receiving each of the subparts from at least one source;

Wherein identifying the plurality of subparts includes: during receipt of the plurality of subparts, rendering at least one of the subparts as a first individually selectable link for retrieving first content currently stored at a first distinct location Wherein rendering the at least one of the subparts as a first individually selectable link includes: activating the at least one of the subparts as a live reference to content currently stored at a first distinct location Wherein activating the at least one of the subparts in activating the at least one of the subparts includes: receiving a first subpart prior to receiving a second subpart; and as at least one portion of the second subpart is received, providing a functionality for retrieving the content currently stored at the first distinct location upon detecting selection of the first subpart.

15. The computerized device of claim 14 wherein identifying a plurality of subparts of the uniform resource locator comprises:

displaying an identification of each of the plurality of subparts, wherein each identification graphically distinguishes adjacent subparts; and Wherein displaying an identification of each of the plurality of subparts comprises at least one of:

Displaying an identification of a first subpart using a first color, and displaying an identification of an adjacent second subpart using a second color;

displaying an underline below the uniform resource locator, wherein the underline has at least one identification marker for distinguishing adjacent subparts of the uniform resource locator; and displaying each subpart using a unique highlight.

16. The computerized device of claim 14 wherein identifying a plurality of subparts of the uniform resource locator comprises: parsing the uniform resource locator in order to identify the plurality of subparts; and wherein parsing the uniform resource locator comprises:

identifying subpart delimiters embedded in the uniform resource locator, wherein the subpart delimiters distinguish the subparts of the uniform resource locator.

17. The computerized device of claim 14 wherein receiving a selection of a subpart of the uniform resource locator comprises:

detecting, in a graphical user interface, the selection of a subpart from an input device when the graphical representation of the input device is within a predetermined distance from a graphical representation of the subpart in the graphical user interface;

upon detecting the selection of the subpart, graphically distinguishing the selected subpart from other subparts of the uniform resource locator; and wherein graphically distinguishing the selected subpart from other subparts of the uniform resource locator comprises:

displaying the selected subpart in a first color; and
displaying unselected subparts of the uniform resource in a second color.

18. The computerized device of claim 14 wherein receiving a selection of a subpart of the uniform resource locator comprises:

detecting, in a graphical user interface, the selection of a subpart from an input device when the graphical representation of the input device is within a predetermined distance from a graphical representation of the subpart in the graphical user interface;

upon detecting the selection of the subpart, graphically distinguishing the selected subpart from other subparts of the uniform resource locator; and wherein graphically distinguishing the selected subpart from other subparts of the uniform resource locator comprises:

displaying the selected subpart in a first color; and displaying subparts that occur in the uniform resource locator prior to the selected subpart in the first color; and displaying subparts that occur after the selected subpart in the second color, wherein the subparts that occur after have a lower hierarchical order in the uniform resource locator than the selected subpart.

19. A non-transitory computer readable medium comprising executable computer program code encoded thereon operable on a computerized device to perform processing comprising:

Computer code for identifying a uniform resource locator;

Computer code for identifying a plurality of subparts of the uniform resource locator (URL), wherein identifying the plurality of subparts includes: displaying, on a display screen, each subpart as a respective portion of a selectable instance of the URL, wherein each subpart in the selectable instance of the URL comprises an individually selectable link for retrieving content currently stored at a distinct location, wherein content retrieved upon selection of any individually selectable link comprises content different than content retrieved upon receiving selection of the entire selectable instance of the URL;

Computer code for receiving a selection of a subpart displayed as part of the selectable instance of the URL; and Computer code for referencing, in response to the selection of the subpart displayed as part of the selectable instance of the URL, the distinct location associated with the selected subpart, wherein the computer code for referencing the distinct location includes retrieving the content currently stored at the distinct location;

Wherein identifying the uniform resource locator includes: receiving each of the subparts from at least one source;

Wherein identifying the plurality of subparts includes: during receipt of the plurality of subparts, rendering at least one of the subparts as a first individually selectable link for retrieving first content currently stored at a first distinct location Wherein rendering the at least one of the subparts as a first individually selectable link includes: activating the at least one of the subparts as a live reference to content currently stored at a first distinct location Wherein activating the at least one of the subparts in activating the at least one of the subparts includes: receiving a first subpart prior to receiving a second subpart; and as at least one portion of the second subpart is received, providing a functionality for retrieving the content currently stored at the first distinct location upon detecting selection of the first subpart.

20. The computer program product of claim 19 wherein the computer program code for identifying a plurality of subparts of the uniform resource locator comprises:

computer program code for parsing the uniform resource locator in order to identify the plurality of subparts; and wherein the computer program code for parsing the uniform resource locator comprises:

computer program code for identifying subpart delimiters embedded in the uniform resource locator, wherein the subpart delimiters distinguish the subparts of the uniform resource locator; and wherein the computer program code for receiving a selection of a subpart of the uniform resource locator comprises:

computer program code for detecting, in a graphical user interface, the selection of a subpart from an input device when the graphical representation of the input device is within a predetermined distance from a graphical representation of the subpart in the graphical user interface; and upon detecting the selection of the subpart, computer program code for graphically distinguishing the selected subpart from other subparts of the uniform resource locator.

21. The method as in claim 1, comprising:

Concurrently displaying the first subpart and the second subpart as respective portions of the selectable instance of the URL displayed in a document, the first subpart referencing a location of first content, the location of first content being different than a location represented by the selectable instance of the URL in its entirety, the location of second content being different than the location represented by the selectable instance of the URL in its entirety, the location of second content being different than the location of first content, Wherein the second subpart represents a hierarchically deeper portion of the selectable instance of the URL than the first subpart;

Wherein the first subpart further comprises a portion of the second subpart.

22. The method as in claim 21, wherein referencing the distinct location associated with the selected subpart includes:

in response to an individual selection of the first subpart currently displayed in the selectable instance of the URL, obtaining the first content from the location of the first content.

23. The method as in claim 21, wherein referencing the distinct location associated with the selected subpart includes:

In response to an individual selection of the second subpart currently displayed in the selectable instance of the URL, obtaining the second content from the location of the second content.

24. The method as in claim 1, wherein receiving a selection of a subpart displayed as part of the selectable instance of the URL includes:

identifying the selection of the subpart as a request to access content at a first location, wherein the selectable instance of the URL is suitable for retrieval of content at a second location in response to receiving a selection of the selectable instance of the URL in its entirety, wherein the selection of the selectable instance of the URL in its entirety represents a concurrent selection of all the respective subparts that make up the selectable instance of the URL; and wherein referencing the distinct location associated with the selected subpart includes:

in response to the selection of the subpart, obtaining the content at the first location instead of obtaining content at the second location.

25. The method of claim 1, wherein displaying each subpart as a respective portion of a selectable instance of the URL includes:

Prior to receiving the selection of a subpart, rendering each subpart according to a distinct color, the distinct color graphically distinguishing a respective subpart as colored differently than all other subparts of the selectable instance of the URL.

26. The method of claim 1, wherein displaying each subpart as a respective portion of a selectable instance of the URL includes:

Rendering a first subpart to be a first individually selectable link for retrieving the first content currently stored at the first distinct location; and Rendering a second subpart to be a second individually selectable link for retrieving the second content currently stored at a second distinct location, wherein both the first content and the second content comprise content different than the content retrieved upon receiving selection of the entire selectable instance of the URL.

27. The method of claim 26, comprising:

Rendering the first subpart according to a first color; and

Rendering the second subpart according to a second color, the first color visually distinguishable from the second color.

* * * * *

UNITED STATES PATENT AND TRADEMARK OFFICE
CERTIFICATE OF CORRECTION

| | | |
|---|---|---|
| PATENT NO. | : 7,849,193 B1 | Page 1 of 6 |
| APPLICATION NO. | : 11/701088 | |
| DATED | : December 7, 2010 | |
| INVENTOR(S) | : Paresh Goel | |

It is certified that error appears in the above-identified patent and that said Letters Patent is hereby corrected as shown below:

Column 11-12
Claim 1, Line 2
Delete "Identifying" and insert --identifying-- in place thereof Claim 1, Line 3
Delete "Identifying" and insert --identifying-- in place thereof Claim 1, Line 14
Delete "Receiving" and insert --receiving-- in place thereof Claim 1, Line 16
Delete "In" and insert --in-- in place thereof Claim 1, Line 21
Delete "Wherein" and insert --wherein-- in place thereof Claim 1, Line 24
Delete "Wherein" and insert --wherein-- in place thereof Claim 1, Line 28
Insert a --;-- following the word "location"

Claim 1, Line 29
Delete "Wherein" and insert --wherein-- in place thereof

Claim 1, Line 32
Insert --; and-- following the word "location"

Signed and Sealed this
First Day of February, 2011

David J. Kappos
*Director of the United States Patent and Trademark Office*

Claim 1, Line 33
Delete "Wherein" and insert --wherein-- in place thereof

Column 13
Claim 10, Line 3
Delete "Identifying" and insert --identifying-- in place thereof Claim 10, Line 5
Delete "Identifying" and insert --identifying-- in place thereof Claim 10, Line 8
Delete "Identifying" and insert --identifying-- in place thereof Claim 12, Line 2
Delete "Identifying" and insert --identifying-- in place thereof Claim 12, Line 3
Delete "Parsing" and insert --parsing-- in place thereof Claim 12, Line 6
Delete "Displaying" and insert --displaying-- in place thereof Claim 12, Line 10
Delete "Displaying" and insert --displaying-- in place thereof Claim 12, Line 21
Delete "Receiving" and insert --receiving-- in place thereof Claim 12, Line 23
Delete "In" and insert --in-- in place thereof Claim 12, Line 29
Delete "Wherein" and insert --wherein-- in place thereof Claim 12, Line 31
Delete "Wherein" and insert --wherein-- in place thereof Claim 12, Line 35
Insert a --;-- following the word "location"

Claim 12, Line 36
Delete "Wherein" and insert --wherein-- in place thereof

CERTIFICATE OF CORRECTION (continued)
U.S. Pat. No. 7,849,193 B1

Claim 12, Line 39
Insert --; and-- following the word "location"

Claim 12, Line 40
Delete "Wherein" and insert --wherein-- in place thereof

Column 14
Claim 13, Line 2
Delete "Identifying" and insert --identifying-- in place thereof Claim 13, Line 3
Delete "Parsing" and insert --parsing-- in place thereof Claim 13, Line 6
Delete "Displaying" and insert --displaying-- in place thereof Claim 13, Line 9
Delete "Displaying" and insert --displaying-- in place thereof Claim 13, Line 20
Delete "Receiving" and insert --receiving-- in place thereof Claim 13, Line 22
Delete "Displaying" and insert --displaying-- in place thereof Claim 13, Line 25
Delete "In" and insert --in-- in place thereof Claim 13, Line 31
Delete "Wherein" and insert --wherein-- in place thereof Claim 13, Line 33
Delete "Wherein" and insert --wherein-- in place thereof Claim 13, Line 37
Insert a --;-- following the word "location"

Claim 13, Line 38
Delete "Wherein" and insert --wherein-- in place thereof

Claim 13, Line 41
Insert --; and-- following the word "location"

Claim 13, Line 42
Delete "Wherein" and insert --wherein-- in place thereof

CERTIFICATE OF CORRECTION (continued)
U.S. Pat. No. 7,849,193 B1

Claim 14, Line 2
Delete "A" and insert --a-- in place thereof

Claim 14, Line 3
Delete "A" and insert --a-- in place thereof

Claim 14, Line 4
Delete "A" and insert --a-- in place thereof

Claim 14, Line 5
Delete "An" and insert --an-- in place thereof

Claim 14, Line 7
Delete "Wherein" and insert --wherein-- in place thereof

Claim 14, Line 11
Delete "Identifying" and insert --identifying-- in place thereof Claim 14, Line 12
Delete "Identifying" and insert --identifying-- in place thereof Claim 14, Line 23
Delete "Receiving" and insert --receiving-- in place thereof Claim 14, Line 25
Delete "In" and insert --in-- in place thereof Claim 14, Line 31
Delete "Wherein" and insert --wherein-- in place thereof Claim 14, Line 33
Delete "Wherein" and insert --wherein-- in place thereof Claim 14, Line 37
Insert a --;-- following the word "location"

Claim 14, Line 38
Delete "Wherein" and insert --wherein-- in place thereof

Claim 14, Line 41
Insert --; and-- following the word "location"

Claim 14, Line 42
Delete "Wherein" and insert --wherein-- in place thereof

Column 15
Claim 15, Line 7
Delete "Wherein" and insert --wherein-- in place thereof Claim 15, Line 9
Delete "Displaying" and insert --displaying-- in place thereof Column 16
Claim 19, Line 5
Delete "Computer" and insert --computer-- in place thereof Claim 19, Line 6
Delete "Computer" and insert --computer-- in place thereof Claim 19, Line 18
Delete "Computer" and insert --computer-- in place thereof Claim 19, Line 20
Delete "Computer" and insert --computer-- in place thereof Claim 19, Line 26
Delete "Wherein" and insert --wherein-- in place thereof Claim 19, Line 28
Delete "Wherein" and insert --wherein-- in place thereof Claim 19, Line 32
Insert a --;-- following the word "location"

Claim 19, Line 33
Delete "Wherein" and insert --wherein-- in place thereof

Claim 19, Line 36
Insert --; and-- following the word "location"

Claim 19, Line 37
Delete "Wherein" and insert --wherein-- in place thereof

Column 17
Claim 21, Line 2
Delete "Concurrently" and insert --concurrently-- in place thereof Claim 21, Line 12
Delete "Wherein" and insert --wherein-- in place thereof

CERTIFICATE OF CORRECTION (continued)
U.S. Pat. No. 7,849,193 B1

Claim 21, Line 15
Delete "Wherein" and insert --wherein-- in place thereof

Column 18
Claim 23, Line 4
Delete "In" and insert --in-- in place thereof

Claim 25, Line 4
Delete "Prior" and insert --prior-- in place thereof

Claim 26, Line 4
Delete "Rendering" and insert --rendering-- in place thereof

Claim 26, Line 7
Delete "Rendering" and insert --rendering-- in place thereof

Claim 27, Line 2
Delete "Rendering" and insert --rendering-- in place thereof

Claim 27, Line 3
Delete "Rendering" and insert --rendering-- in place thereof